US010067729B2

(12) United States Patent
Handrigan et al.

(10) Patent No.: US 10,067,729 B2
(45) Date of Patent: *Sep. 4, 2018

(54) SYSTEMS AND METHODS FOR ENABLING INTERNET CO-BROWSING

(71) Applicant: Recursive Labs, Inc., St. Louis, MO (US)

(72) Inventors: Brian David Handrigan, Wildwood, MO (US); Mark David Comiso, Cupertino, CA (US); Eldon Spencer Markowski, Fishers, IN (US)

(73) Assignee: Recursive Labs, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,229

(22) Filed: Nov. 11, 2015

(65) Prior Publication Data
US 2016/0062727 A1 Mar. 3, 2016

Related U.S. Application Data

(63) Continuation of application No. 13/545,810, filed on Jul. 10, 2012, now Pat. No. 9,256,691.

(51) Int. Cl.
G06F 9/54 (2006.01)
G06F 3/14 (2006.01)
(Continued)

(52) U.S. Cl.
CPC .............. *G06F 3/1454* (2013.01); *G06F 9/54* (2013.01); *G06F 9/542* (2013.01);
(Continued)

(58) Field of Classification Search
CPC ................. G06F 3/1454; G06F 3/0483; G06F 17/30873; H04L 65/403
(Continued)

(56) References Cited

U.S. PATENT DOCUMENTS 6,871,213 B1 * 3/2005 Graham ............ G06F 17/30873
707/E17.111
7,139,799 B2 11/2006 Qian et al.
(Continued)

FOREIGN PATENT DOCUMENTS

WO 2008008806 A2 1/2008

OTHER PUBLICATIONS

Atterer, et al. A Proxy-Based Infrastructure for Web Application Sharing and Remote Collaboration on Web Pages. Sep. 2007 Publisher:Springer Science & Business Media B.V.; Interact 2007, pp. 74-87.
(Continued)

*Primary Examiner* — Ranodhi Serrao
*Assistant Examiner* — James N Fiorillo
(74) *Attorney, Agent, or Firm* — Polsinelli PC

(57) ABSTRACT

Systems and methods for enabling co-browsing are provided herein. A device, such as a web server, may execute a browser application that initiates co-browsing capabilities between a host computing device and one or more guest computing devices. Activatable code is injected and/or otherwise embedded in one or more web pages. Subsequently, using the activatable code, web browser information on the host computing device is obtained and processed for display on the one or more guest computing devices.

18 Claims, 7 Drawing Sheets

(51) Int. Cl.
  *G06F 17/30* (2006.01)
  *G06F 17/22* (2006.01)
(52) U.S. Cl.
  CPC .......... *G06F 17/2247* (2013.01); *G06F 17/30* (2013.01); *G06F 17/30873* (2013.01); *G06F 17/30991* (2013.01)
(58) Field of Classification Search
  USPC .................................. 709/203, 204; 719/318
  See application file for complete search history.

(56) References Cited

U.S. PATENT DOCUMENTS

| | | | |
|---|---|---|---|
| 7,149,776 B1 | 12/2006 | Roy et al. | |
| 7,188,143 B2 * | 3/2007 | Szeto | H04L 51/04 707/999.104 |
| 7,200,590 B2 * | 4/2007 | Everett-Church | G06F 17/30864 707/758 |
| 7,287,054 B2 | 10/2007 | Lee et al. | |
| 7,305,439 B2 | 12/2007 | Qian et al. | |
| 7,370,269 B1 | 5/2008 | Prabhu et al. | |
| 7,623,650 B2 | 11/2009 | Dalton et al. | |
| 7,650,378 B2 | 1/2010 | Shafron et al. | |
| 7,660,899 B2 | 2/2010 | Gavrilescu et al. | |
| 7,702,811 B2 | 4/2010 | Gopalan et al. | |
| 7,933,955 B2 | 4/2011 | Khalatian | |
| 7,937,440 B2 | 5/2011 | Lee et al. | |
| 7,941,755 B2 | 5/2011 | Siegrist et al. | |
| 8,010,901 B1 | 8/2011 | Rogers et al. | |
| 8,015,496 B1 | 9/2011 | Rogers | |
| 8,051,178 B2 * | 11/2011 | Skidgel | G06F 17/30873 709/203 |
| 8,682,977 B1 * | 3/2014 | Roy | H04L 65/403 709/205 |
| 2008/0052377 A1 | 2/2008 | Light | |
| 2008/0126931 A1 * | 5/2008 | Kojima | G06F 9/451 715/704 |
| 2009/0164581 A1 * | 6/2009 | Bove | G06F 17/30873 709/205 |
| 2009/0234721 A1 | 9/2009 | Bigelow et al. | |
| 2010/0037153 A1 | 2/2010 | Rogers | |
| 2010/0067047 A1 | 3/2010 | Miyamoto et al. | |
| 2010/0082747 A1 * | 4/2010 | Yue | G06F 17/30873 709/204 |
| 2010/0083135 A1 * | 4/2010 | Zawacki | G06F 17/30873 715/753 |
| 2010/0218105 A1 * | 8/2010 | Perov | G06F 17/30873 715/738 |
| 2010/0235737 A1 | 9/2010 | Koh et al. | |
| 2010/0250755 A1 | 9/2010 | Morris | |
| 2010/0257451 A1 | 10/2010 | Halevi et al. | |
| 2010/0306642 A1 * | 12/2010 | Lowet | G06F 17/30873 715/234 |
| 2011/0072081 A1 | 3/2011 | Fang et al. | |
| 2011/0072355 A1 | 3/2011 | Carter et al. | |
| 2011/0119352 A1 * | 5/2011 | Perov | G06F 17/30873 709/218 |
| 2011/0126130 A1 * | 5/2011 | Lieb | G06F 3/1454 715/753 |
| 2011/0154219 A1 | 6/2011 | Khalatian | |
| 2011/0173256 A1 | 7/2011 | Khalatian | |
| 2011/0191676 A1 | 8/2011 | Guttman et al. | |
| 2011/0252305 A1 | 10/2011 | Tschani et al. | |
| 2011/0289156 A1 | 11/2011 | Pirnazar | |
| 2011/0289157 A1 | 11/2011 | Pirnazar | |
| 2012/0174121 A1 * | 7/2012 | Treat | G06F 9/542 719/318 |
| 2012/0266068 A1 | 10/2012 | Ryman et al. | |
| 2013/0086487 A1 * | 4/2013 | Findlay | H04N 7/15 715/753 |
| 2013/0159414 A1 * | 6/2013 | Zhou | H04L 65/403 709/204 |
| 2013/0173570 A1 | 7/2013 | Bennett et al. | |
| 2014/0019888 A1 * | 1/2014 | Paniagua | G06F 3/0484 715/760 |
| 2014/0108542 A1 * | 4/2014 | Cheng | H04L 65/403 709/204 |
| 2014/0207872 A1 * | 7/2014 | Roy | H04L 65/403 709/205 |
| 2015/0149558 A1 * | 5/2015 | Mendez | G06F 17/30873 709/205 |
| 2015/0346937 A1 * | 12/2015 | Mahmoudian-Bidgoly | G06F 3/0484 715/753 |
| 2016/0014209 A1 * | 1/2016 | Cesena | H04L 67/141 709/203 |
| 2017/0097997 A1 * | 4/2017 | Moyers | G06F 17/30864 |
| 2017/0285898 A1 * | 10/2017 | Paniagua | G06F 3/0483 |

OTHER PUBLICATIONS

International Search Report and Written Opinion regarding PCT/US2013/035718 dated Aug. 8, 2013, 6 pages.

Dengue, et al. "WebNC: Efficient Sharing of Web Applications" (Proceedings of the 20th ACM Conference on Hypertext and Hypermedia, pp. 365-366, Jul. 29-30, 2009).

* cited by examiner

SYSTEMS AND METHODS FOR ENABLING INTERNET CO-BROWSING

TECHNICAL FIELD

Aspects of the present disclosure relate to web browsing, and more particularly, systems and methods for enabling multiple users to share a web-browsing experience.

BACKGROUND

Collaborative browsing, known as co-browsing, represents the joint navigation of web-related content by two or more people accessing one or more web pages at the same time. Co-browsing has many practical applications and may be used in a variety of different types of communications, such as in customer support, social connections, business presentations, product selection, etc. Effectively, co-browsing allows one or more users to share an identical web-browsing experience.

While various co-browsing methods have been developed, many co-browsing systems provide limited capabilities. For example, many co-browsing systems fail to insure that every user's view of the web content being viewed between a viewer and a host remains the same throughout an entire co-browsing session. Moreover, many co-browsing systems only synchronize the page location (i.e., the URL) of the page that is intended to be shared. As co-browsing becomes more mainstream, co-browsing systems capable of offering more diverse co-browsing functionalities, such as supporting the automatic synchronization of a browser's entire state and content, including viewport experience, frames, portlets, form fields, controls, etc., may be needed. It is with these observations in mind, among others, that the various aspects of the present disclosure were developed.

SUMMARY

Aspects of the present disclosure include methods for enabling co-browsing. The method may be performed by a processor, such as a computing device. The method includes receiving guest data identifying one or more guest computing devices to participate in a co-browsing session with a host computing device. The method also includes activating injector code embedded within one or more websites displayed in a first web browser including a viewport on the host computing device, the injector code configured to generate a second web browser that captures the viewport. The method further includes transmitting the viewport to the one or more guest devices for display.

Aspects of the present disclosure include systems for enabling co-browsing. The system includes at least one processor. The system also includes a co-browser application comprising modules executable by the at least one processor. The modules include a graphical user interface module to receive guest data identifying one or more guest computing devices to participate in a co-browsing session with a host computing device. The modules also include a processing module to activate injector code embedded within one or more websites displayed in a first web browser including a viewport on a host computing device, the injector code configured to generate a second web browser that captures the viewport and transmits the viewport to the one or more guest devices for display.

Finally, aspects of the present disclosure include non-transitory computer readable mediums for enabling co-browsing. The non-transitory computer readable medium is encoded with a browser application comprising modules executable by a processor. The modules include a graphical user interface module to received guest data identifying one or more guest computing devices to participate in a co-browsing session with a host computing device. The modules also include a processing module to activate injector code embedded within one or more websites displayed in a first web browser including a viewport on a host computing device, the injector code configured to generate a second web browser that captures the viewport and transmits the viewport to the one or more guest devices for display.

BRIEF DESCRIPTION OF THE DRAWINGS

The foregoing and other objects, features, and advantages of the present disclosure set forth herein will be apparent from the following description of exemplary embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only exemplary embodiments of the present disclosure and, therefore, are not to be considered limiting in scope.

DETAILED DESCRIPTION

Aspects of the present disclosure enable co-browsing, or the sharing of a screen, displayed on a host computing device with one or more guest computing devices to enable a co-browsing experience. In various aspects, program code is integrated into the source code of one or more web pages. The program code may be a set of software instructions and/or modules that add functionalities and/or modify existing functionalities of the web page to enable co-browsing. In particular, the program code may be activated to implement a browser-within-a-browser on the host computing device that gathers, processes, analyzes, and/or otherwise captures browser information from both the host and guest computing device during a co-browsing session. Subsequently, the browser information may be provided to one or more guest computing devices and processed for display, thereby enabling a co-browsing experience between the one or more guest computing devices and the host computing device.

Figure 1:
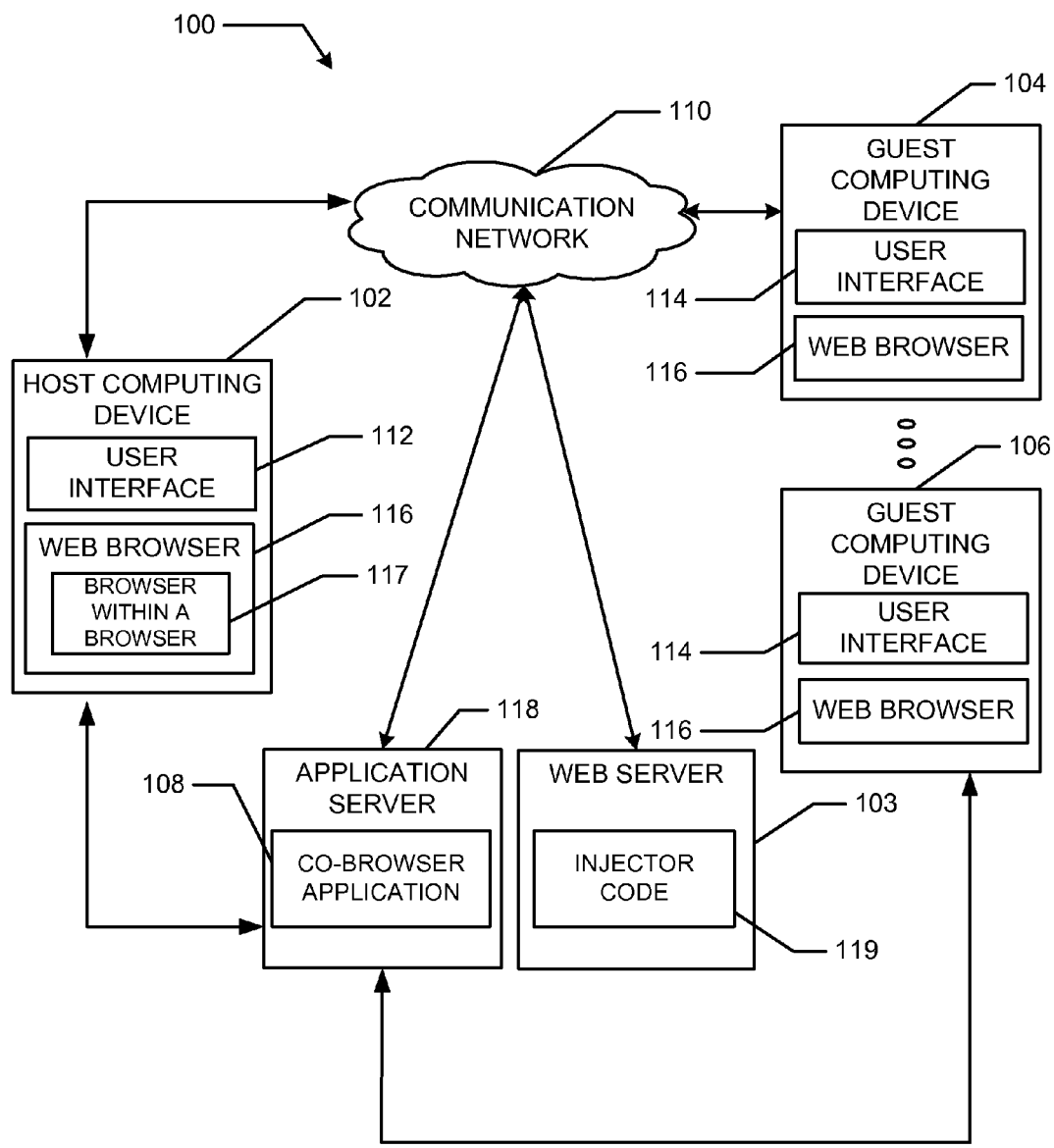
FIG. 1 is a block diagram illustrating a computing environment for enabling co-browsing, according to aspects of the present disclosure.

FIG. 1 illustrates an example computing environment 100 for co-browsing in accordance with aspects of the present disclosure. The computing environment 100 includes a host computing device 102 in communication with a web server system 103 and an application server 118. The computing environment 100 also includes guest computing devices 104-106 in communication with the application server 118 via a communication network 110. The communication network 110 can be the Internet, an intranet, a local area network, a wireless local network, a wide area network, or another communication network, as well as combinations of such networks. The guest computing devices 104-106 may transmit requests to and/or receive responses from the application server 118 to communicate with the host computing device 102 through the communication network 110 to enable co-browsing. Additionally, the host computing device 102 may transmit requests to and/or receive responses from both the web server 103 and the application server 118 to communicate with the guest computing devices 104-106.

The host computing device 102 and/or the guest computing devices 104-106 may be a personal computer, work station, server, mobile device, mobile phone, tablet device, processor, and/or other processing device. Each device may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communication, such as through the Internet, an intranet, an Ethernet network, a wireline network, a wireless network, a mobile communications network, and/or another communication network. The host computing device 102 and/or the guest computing devices 104-106 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, web forms, web application pages, and other data.

The host computing device 102 and/or the guest computing devices 104-106 may include a user-interface (UI) 112 and 114, respectively, to receive input from a user to enable co-browsing. UIs 112 and 114 may include a display (not shown) such as a computer monitor, liquid crystal display, for viewing data and/or input forms, and any combination of input/output devices (not shown), such as a keyboard or a pointing device (e.g., a mouse, trackball, pen, or touch pad), speaker, and/or any other type of device for receiving input to enable co-browsing.

The host computing device 102 may include a web browser 116, such as Microsoft Internet Explorer®, Mozilla Firefox®, Safari®, Google Chrome®, etc., capable of presenting various types of web content including web pages, images, audio, video, multimedia, and/or any combination thereof. In one particular embodiment, the web browser may be a Java-enabled browser and/or web browser capable of interpreting and/or otherwise processing Java® code and/or Javascript® code. While a browser capable of interpreting Java® code has been described, it is contemplated that any type of web browser capable of processing web content, such as web pages, may be included in the host computing device 102 and guest computing devices 104-106. The web browser 116 may be capable of executing, rendering, and/or otherwise initiating a browser within a browser 117 (i.e., a second browser within the web browser 116). The browser within a browser 117 may perform various web functions including the same functions capable of being performed by the web browser 116.

A user may access the UI 112 of the host computing device 102 to perform various web-related interactions, such as request web pages, web content, etc. In one particular embodiment, a user may access the UI 112 of the host computing device 102 to transmit a request to the application server 118 to initiate a co-browsing session or to transmit a web page navigation request to the web server 103, which may be a server and may include various software and/or hardware components for processing web page requests, such as HTTP requests, to access web pages using uniform resource locator(s) ("URL"). For example, the web server 103 may receive an HTTP request via a URL from the host computing device 102, and in response, provide a particular web page corresponding to the URL.

The application server 118 may be a server and may include various hardware and/or software components for processing web page or other communication requests, such as HTTP requests, to access web pages using URLs. The application server 118 may also receive various web-related requests from various devices (e.g. the guest computing devices 104-106), and may transmit web pages and/or web content to the devices in response to such requests. In one particular embodiment, the application server 118 may be the processing device used to initiate the co-browser application 108 to enable and subsequently manage a co-browsing session between the host computing device 102 and the various guest computing devices 104-106.

While aspects of the present disclosure have been described as being performed using multiple devices within a computing environment, such as computing environment 100 shown in FIG. 1, it is contemplated that such aspects may be performed locally, using only a single device, such as the host computing device 102. The co-browser application 108 may be located on the host computing device 102 and/or on the guest computing devices 104-106, or elsewhere.

Figure 2:
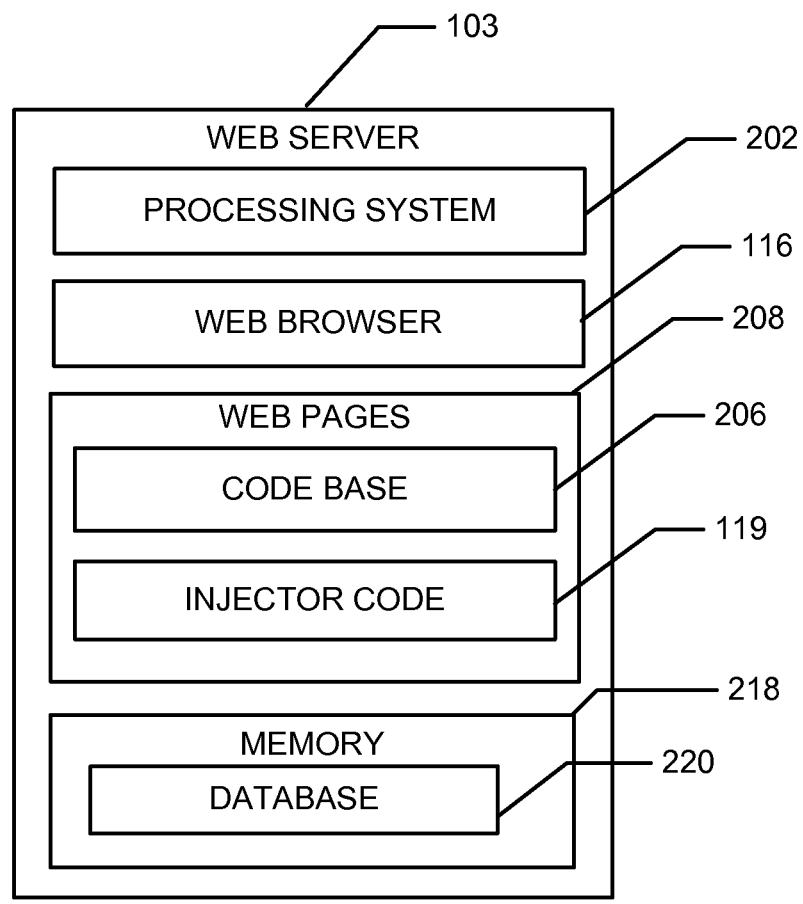
FIG. 2 is a block diagram illustrating a web server, according to aspects of the present disclosure.

FIG. 2 is an example block diagram illustrating the various hardware and/or software components of the web server 103 according to one exemplary embodiment of the present disclosure. The web server 103 may include a database 220. The database 220 may be a general repository of data including web pages, web page data, webpage content and/or any other data or information related to providing web pages and/or web content, etc. The database 220 may include memory and one or more processors or processing systems to receive, process, query and transmit communications and store and retrieve such data. In another embodiment, the database 220 may be a database server.

The web server 103 may include a processor and/or processing system 202 that may be used to process web page requests, such as HTTP requests, and/or access web pages 208. A webpage is a document or information resource that may be accessed through a web browser and displayed on a monitor or mobile device. The information within the webpage may be in HTML or XHTML format, and may provide navigation to other web pages via hypertext links. For example, the web server 103 may receive an HTTP request for a particular webpage via a URL from the host computing device 102, and in response, provide a particular web page of the web pages 208 corresponding to the URL.

The web server 103 may include injector code 119, which may be a code, program code, script, module, applet, application, and/or any other type of executable code capable of being injected and/or otherwise embedded into a webpage, such as web pages 208. Once injected, the injector code 119 may be activated to generate a browser within a browser, such as the browser within a browser 117, and subsequently used to enable a co-browsing session.

In one embodiment, the injector code 119 may be used to track, record, and/or analyze various data statistics related to the web page. The type of data to be tracked by the injector code 119 and returned to the application server 118 in an anonymous fashion for both host and guest computing devices within a shared session may include, but is not limited to, user statistics on web page viewed, items clicked, time of page, time on site, mouse position, mouse movement, mouse speed, viewport dimensions, page scroll, GUI module 308 activities, co-browsing initiation, co-browsing suspension, co-browsing end, etc.

Figure 3:
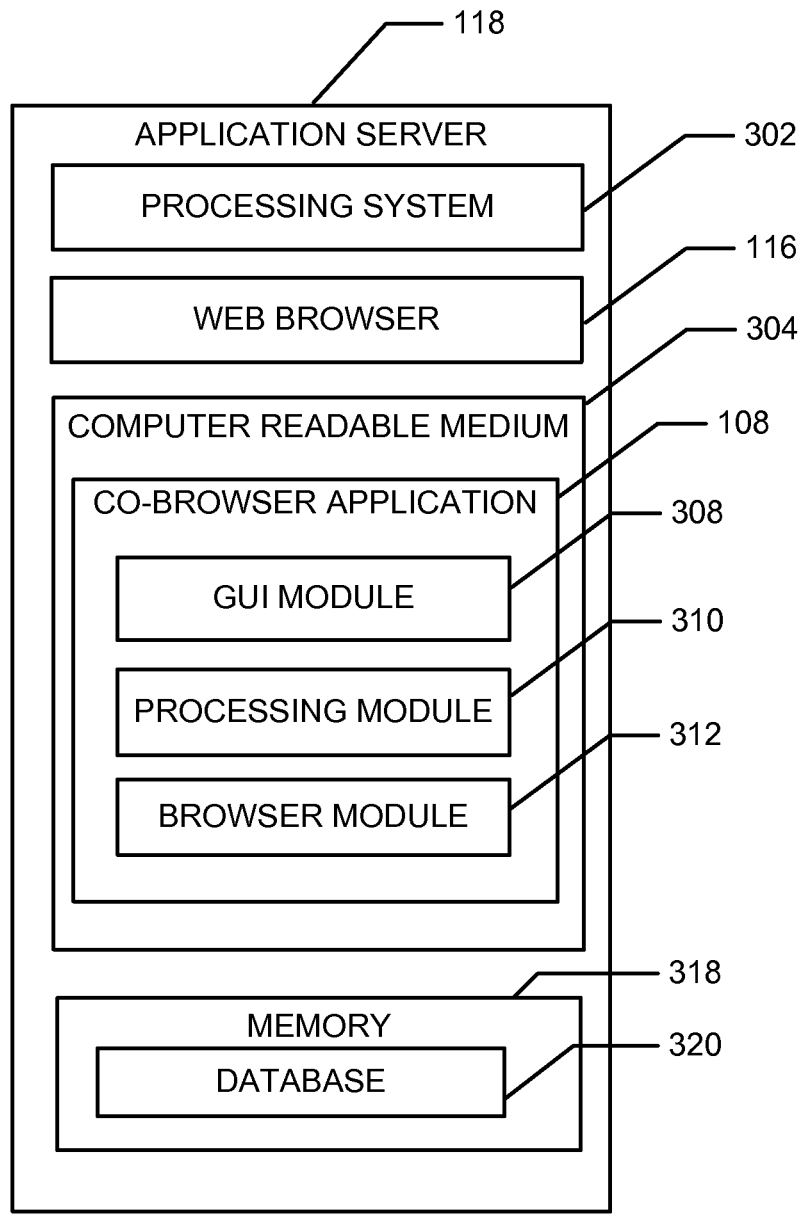
FIG. 3 is a block diagram illustrating an application server, according to aspects of the present disclosure.

FIG. 3 is an example block diagram illustrating the various hardware and/or software components of the application server 118 according to one exemplary embodiment of the present disclosure. The application server 118 may include a processor and/or processing system 302 that may be used to initiate the injector code 119 that enables co-browsing between the host computing device 102 and one or more guest computing devices 104-106. The processing system 302 may include memory and/or be in communication with a memory 318, which may include volatile and/or non-volatile memory and various other supporting computing components.

The application server 118 may include a database 320. The database 320 may be a general repository of data including web pages, web page data, web page content and/or any other data or information related to providing web pages and/or web content, etc. The database 320 may include memory and one or more processors or processing systems to receive, process, query and transmit communications and store and retrieve such data. In another embodiment, the database 320 may be a database server.

The application server 118 may include a computer readable medium ("CRM") 304, which may include computer storage media, communication media, and/or another available computer readable medium that can be accessed by the processing system 302. For example, CRM 304 may include non-transient computer storage media and communication media. By way of example and not limitation, computer storage media includes memory, volatile media, non-volatile media, removable media, and/or non-removable media implemented in a method or technology for storage of information, such as machine/computer readable/executable instructions, data structures, HTML files, executable script code, images, program modules, or other data. Communication media includes machine/computer readable/executable instructions, data structures, program modules, or other data.

The CRM 304 may store executable instructions to implement the co-browser application 108 and/or associated functions, processes, etc. Generally, program modules include routines, programs, instructions, objects, components, data structures, etc., that perform particular tasks or implement particular abstract data types. The processing system 302 of the application server 118 may launch, run, execute, interpret or otherwise perform the logical instructions and/or processes of the co-browser application 108 to enable co-browsing. For example, in one embodiment, the co-browser application may include a GUI module 308, a processing module 310, and a browser module 312 to enable co-browsing. Other modules may also be included.

A GUI module 308 may transmit instructions that may be processed and/or executed to display one or more input forms on the host computing device 102 to receive session initiation and/or login information. Subsequently, a user may interact with the one or more input forms to enter session initiation and/or login information, such as session expansion or instant messaging information. The session initiation and/or login information may include information identifying a particular user and the guest and/or guests invited to co-browse the web session with the user. Each web session associated with a particular user may be encoded in a markup language such as hypertext markup language ("HTML"), LaTex, Standard Generalized Markup Language ("SGML"), Extensible Markup Language ("XML"), etc. It is contemplated that any type of markup language may be used to encode and/or otherwise define the web page. For example, the configuration information may identify and be established by a business enterprise intending to enable co-browsing capabilities for its customers, and one or more web pages (or all) corresponding to the business enterprise, such as the business enterprise's home page, customer support page, etc.

In one particular embodiment, the session initiation and/or login information may include information that articulates the presentation of a web page component that may be integrated within one of the user's associated web pages, which when selected by a user may initiate the activation of program code and/or a script which has been injected and/or embedded within one or more of the web pages associated with the user. The session initiation and/or login information may identify the enterprise's authentication credentials or a specific type of selectable web component such as a button, form, link, icon, image, multimedia component, etc., and may define its size, shape, color, etc. For example, referring to the business enterprise example, the configuration information may indicate that the business enterprise user would like to integrate a button entitled "Start Co-Browsing Session" with selection functionality (e.g., a push button) on its home page in the lower right hand corner, which when selected (i.e., pushed by a user), may activate the injector code 119 to enable various co-browsing capabilities. In yet another embodiment, a pop-up window may appear on the business enterprise's home page indicating that a web page viewer of the enterprise's home page may start a co-browsing session.

A processing module 310 may process the session initiation and/or login information from the injector code 119 and insert additional code in the host computing device 102 web browser 116 to establish a browser within a browser 117 on the host computing device 102. Once the a browser within a browser session is established, all code delivered to the host computing device 102 from the web server 103 may be processed by the browser within a browser 117 code rather than the original web browser 116. However, the display of the browser within a browser 117 experience will remain within the original web browser 116.

Figure 7:
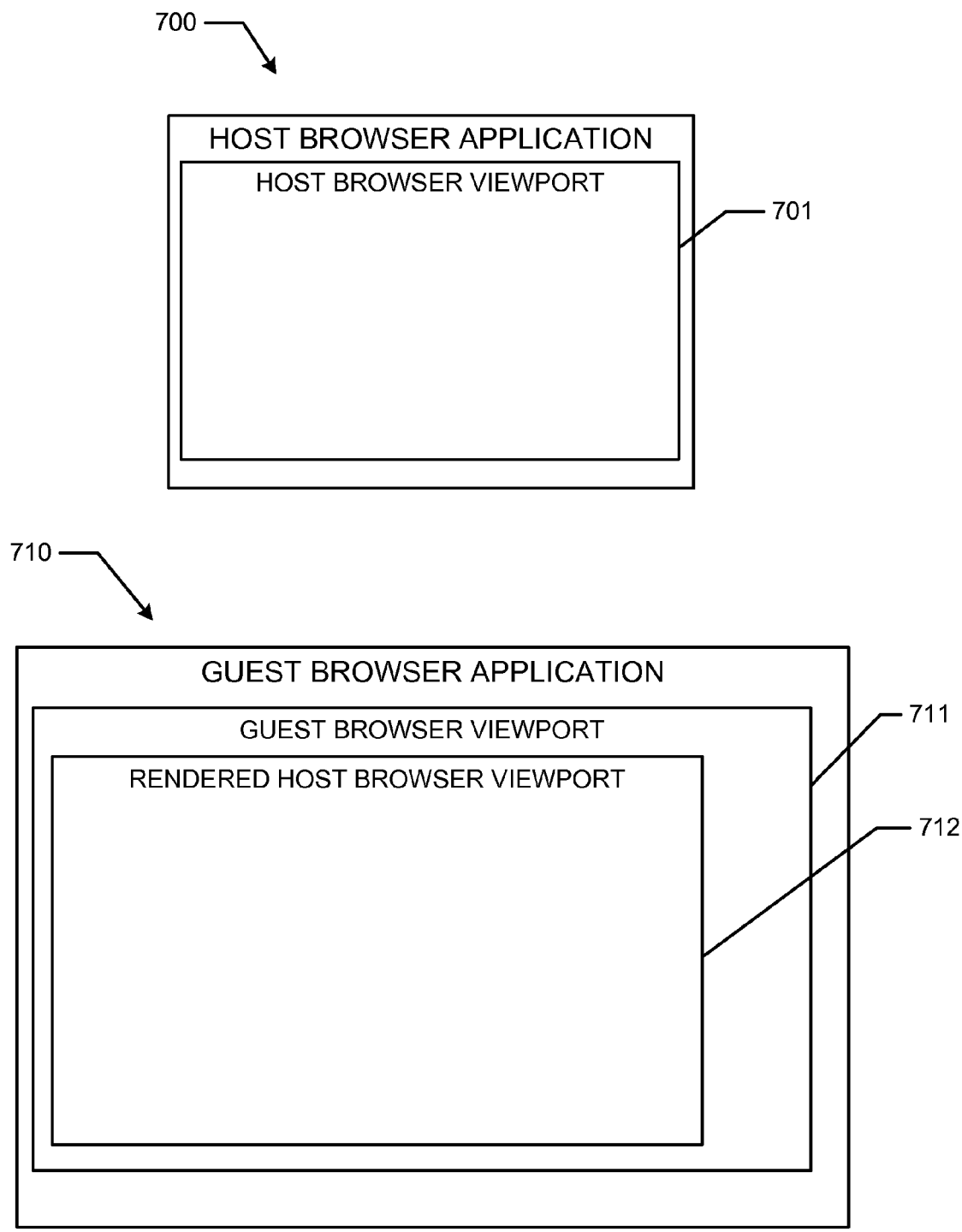
FIG. 7 is a block diagram illustrating viewport rendering, according to aspects of the present disclosure.

In one particular embodiment, when the browser within a browser 117 is activated, the web browser 116 renders the viewport of the host browser application (e.g. web browser 116). FIG. 7 is an example illustration for rendering viewports within a browser, according to aspects of the present disclosure. As shown, when the browser within a browser 117 is activated, a host browser viewport 701 of a host browser application 700 is rendered. The viewport 701 represents the actual display of information from a web server, such as web server 103, on the host computing device 102 and the actual visible area as rendered on the host computing device 102 within the web browser 116 post processing of the HTML from the web server 103. The viewport 701 may be transmitted to the application server 118 for sharing as an exact reproduction of the viewport 701 with the guest computing devices 104-106 via the rendered host browser viewport 712. During an active co-browsing session, the application server 118 will create a notification element on both host computing device 102 and guest computing devices 104-106 via GUI module 308.

Unlike co-browsing solutions that may only forward the HTML or document object model (DOM) or other content based co-browsing solutions of the web session, the host browser viewport 701 may be delivered and/or otherwise transmitted as a pixel-by-pixel rendering of the web page within the host browser application 700 via the web server 103 to the guest browser application 710. Subsequently the host browser viewport 701 may be displayed as the rendered host browser viewport 712, within the guest browser viewport 711 and according to the specifications of the host browser viewport 701, ensuring that the experience of the guest computing devices 104-106 mimics, mirrors, emulates, and/or is exactly the same as the experience of the host computing device 102, regardless of differences in the computing environments of the host computing device 102 and the guest computing devices 104-106.

Referring back to FIG. 2, a browser module 312 may transmit instructions that may be processed and/or executed to display one or more co-browsing input forms, such as an invitation window, on the host computing device 102 for initiating and/or otherwise hosting a co-browsing session. Specifically, the browser module 312 may activate the injector code 119 to generate one or more private communication rooms ("Room") at the application server 118. A Room may be generated on demand from executable code and represents all of the software components and/or infrastructure necessary to support communications, such as screen-sharing and/or co-browsing between the host computing device 102 and the one or more guest computing devices 104-106.

A Room represents a private communications channel enabling the host computing device 102 to transmit its viewport (e.g., viewport 701) and all other communications such as mouse position, mouse movement, page scrolling, page refresh, chat messages, privacy mode (when the host computing device 102 transmits a blackened or otherwise obscured version of its corresponding viewport 701 to the application server 118 instead of a live rendering of the viewport 701 to protect the privacy of the host computing device 102), a guest and session end (i.e., Room close) to and from both the application server 118 and guest computing devices 104-106.

The generated Room may be used by the browser module 312 to obtain or capture the viewport and/or any corresponding viewport information of the web browser 116 located on the host computing device 102. A viewport may be the total area within the web browser 116 that is visible on the host computing device 102. Viewport information may include font information, pixilation information, resolution information, web component coordinate information, and/or any other type of information related to rendering/displaying the web page on the host computing device 102 via the web browser 116. Accordingly, the browser module 312 may access the viewport of the web browser 116 on the host computing device 102 via a JavaScript (or other injectible programming code) browser within a browser that includes and/or otherwise wraps the viewport of the web browser 116, thereby obtaining access to the viewport rendering and control to all of the traditional functionalities of the web browser 116 in the form of a transparent browser within a browser 117. Access to traditional forward, back, reload commands in the browser within a browser 117 may either be provided via the GUI module 308 from the application server 118 or transparently passed to the web browser 116 on the host computing device 102 with content from web server 103 delivered in either case to the browser within a browser 117 while the co-browsing session is active. The browser within a browser 117 may be provided and/or otherwise displayed on the host computing device 102 via the web browser 116.

Once a co-browsing session is established between the host computing device 102 and the one or more guest computing devices 104-106, the browser within a browser 117, the GUI module 308, and/or the web browser 116 may orchestrate the co-browsing session between the host computing device 102 and the one or more guest computing devices 104-106. In particular, the one or more guest computing devices 104-106 may continuously receive a rendered viewport of captured web pages, images, text, multimedia, and/or any other type of web page data such as mouse position, mouse movement, and/or scroll position from the host computing device 102 via the browser within a browser 117 and provide such data to the application server 118. Subsequently, the application server 118 may provide such web data to the one or more guest computing devices 104-106 for display, resulting in the one or more guest computing devices 104-106 viewing exactly what is displayed in the viewport of the host computing device 102. For example, in one particular embodiment, the guest computing devices 104-106 may continuously receive web page image data and screen coordinates corresponding to the web page image data for a portion of the display screen of the host computing device 102.

During an active co-browsing session, both the host computing device 102 and the guest computing devices 104-106 may have a visible status message indicating that the session is being shared; for the host computing device 102, the message may indicate that the host computing device 102 is sharing their web session, by for example displaying the names of the guests a user at the host computing device 102 invited. For the guest computing devices 104-106, the message may indicate that they are viewing a web session hosted by host user name. On both the host computing device 102 and guest computing devices 104-106, the specific device user may have their mouse pointer labeled as "You" while their pointer is located over co-browsing content, and the mouse pointers of the other users may be labeled with each user's respective name as identified by the host computing device 102. Thus, the application server 118 facilitates communication between the host computing device 102 and the one or more guest computing devices 104-106 until the co-browsing session is terminated.

Either user (i.e., a guest user or host user) may terminate a co-browsing session by selecting an "end session" button, for example, in the shared JavaScript browser window, or by closing the browser. In the case a guest terminates the co-browsing session, the co-browsing session will continue for the host and other guest(s). In the case when the guest terminating the co-browsing session is the last (or only) guest, the host will be informed that the guest terminated the co-browsing session and the Room will be closed. In the case the host terminates the co-browsing session, all guests may be immediately notified that the host terminated the co-browsing session and the Room will be closed. When a termination results in a Room being closed, the user who did not terminate the session may be provided with several options. For example, the user may be enabled to "re-invite" the terminated user back into a co-browsing session. When a Room is closed after a successful co-browsing termination, all of the program modules that were loaded into the memory 218 of the application server 118 will be destroyed. Additionally, all tracking data will be stored in the database 220 on the application server 118 and computing resources released for re-use. On the successful termination of a co-browsing session, the browser within a browser 117 on the host computing device 102 will be terminated and the web-browsing activities of the web browser 116 on the host computing device 102 will return to normal operations until another co-browsing session is initiated on a website with configured injector code 119.

Figure 4:
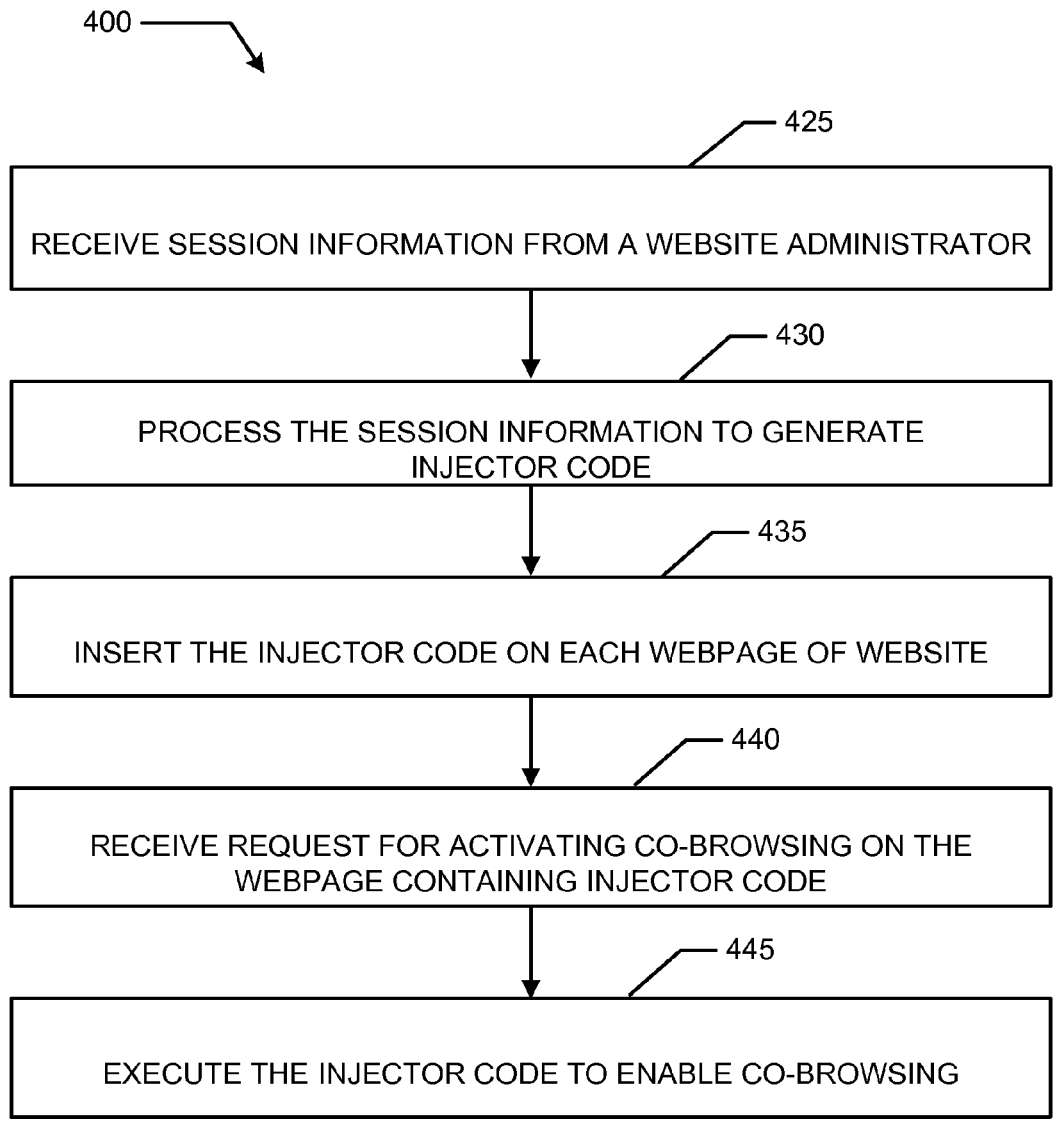
FIG. 4 is a flowchart illustrating an example processes for enabling co-browsing, according to aspects of the present disclosure.

FIG. 4 illustrates a method for enabling co-browsing in accordance with aspects of the present disclosure. At 425, process 400 includes receiving session initiation and/or login information from a user, such as a website administrator. The session initiation and/or login information may be processed to generate the injector code 119 that may be injected into one or more of the web pages associated with the website wanting to add co-browsing functionality identified in the configuration information at 430. At 435, the injector code 119 is inserted into and/or on all web pages of the website (or all of them that will support co-browsing functionality). At 440, a request is received for accessing a web page containing the injector code 119. For example, a user, using the host computing device 102, may enter a URL via the web browser 116 requesting access to a web page stored on the web server 103 that has been injected with the injector code 119. In response to the request, the web server 103 may transmit the requested web page to the host computing device 102. The web page includes the injector code 119 that may be activated to enable co-browsing functionality and may allow a user to activate the injector code 119 via a web component, such as a selectable "invite" button. The web server 103 transmits the requested web page to the host computing device for processing and display via the web browser 116 on the host computing device 102. Once a user selects the web component capable of initiating a co-browsing session displayed and/or otherwise provided on the requested web page, the web browser executes the program code to enable co-browsing at 445.

Figure 5:
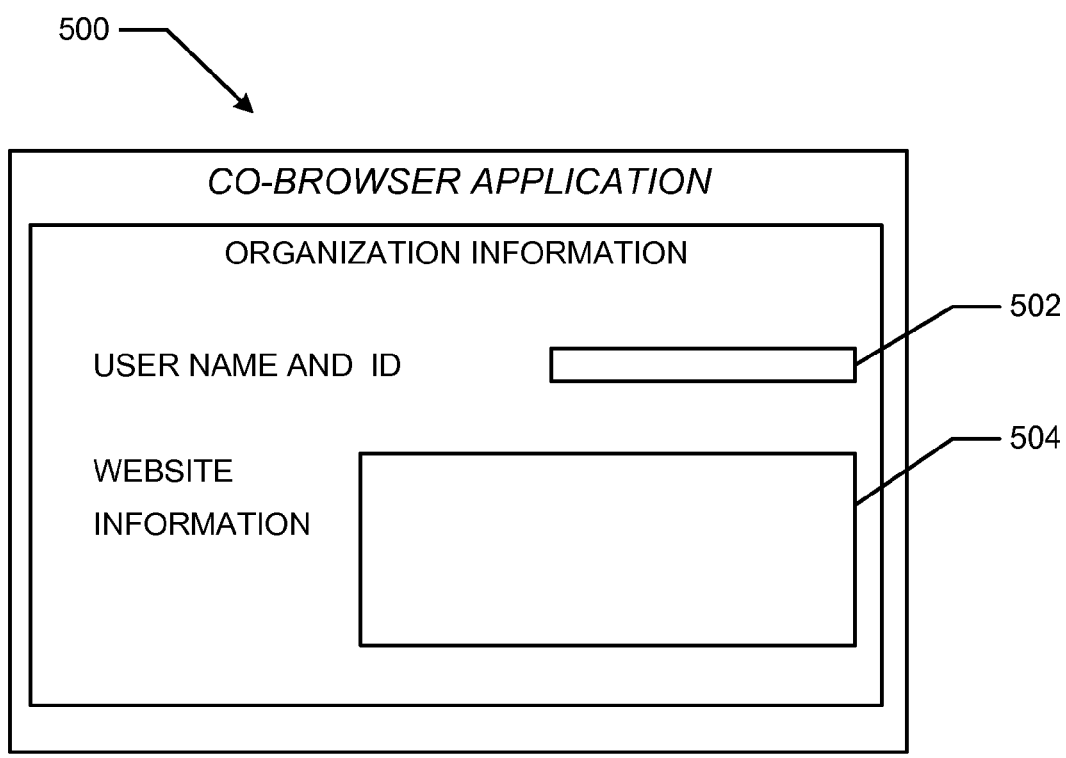
FIG. 5 is an example input form, according to aspects of the present disclosure.

FIG. 5 is an illustrative example of an input form 500 for entering configuration information. As illustrated, a user, such as a website administrator, may enter identification data, such as name in input field 502 and website data identifying a website that the user intends to enable co-browsing on associated with input field 504. Other configuration information may also be provided.

Figure 6:
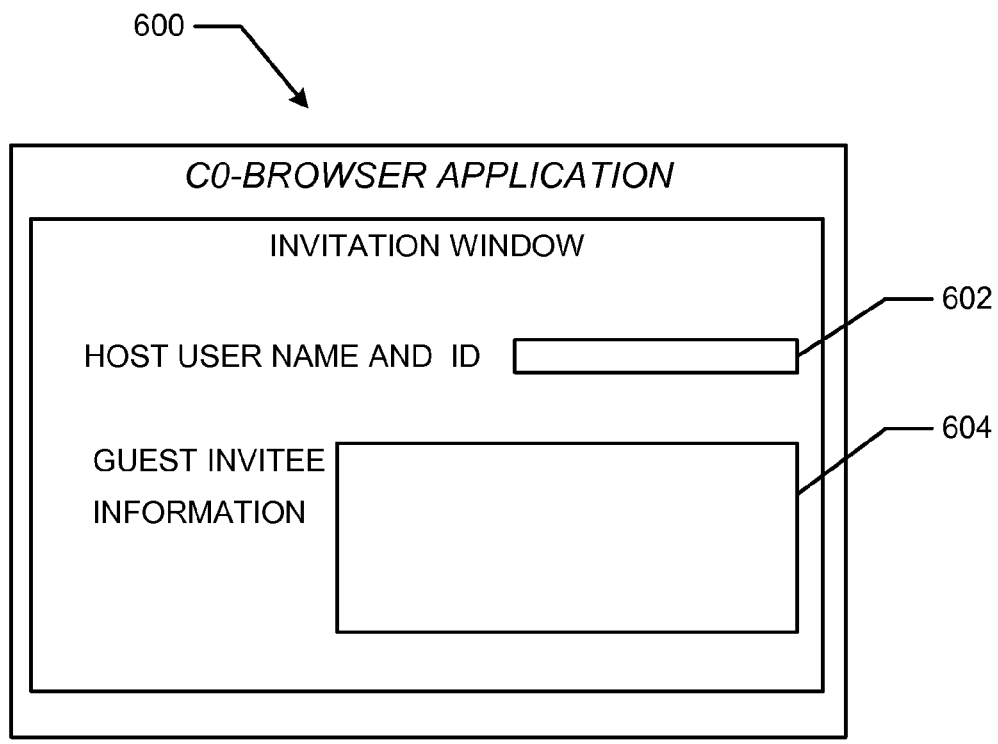
FIG. 6 is another example of an input form, according to aspects of the present disclosure.

FIG. 6 is an illustrative example of another input form 600 for entering identification data and guest data. As shown, the co-browsing input form 600 may receive identification data identifying the user at the host computing device 102 at input field 602 and guest data identifying one or more guest computing devices 104-106 that the identified user wants to share with or otherwise invite to the co-browsing session at input field 604. The browser module 312 may process the guest data to establish the co-browsing session with one or more guests.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various exemplary embodiments, it will be understood that these embodiments are illustrative and that the scope of the disclosure is not limited to them. Many variations, modifications, additions, and improvements are possible. More generally, embodiments in accordance with the present disclosure have been described in the context of exemplary implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for enabling co-browsing comprising:
    initiating a co-browsing session between a guest computing device and a host computing device by:
    activating injector code embedded within a webpage displayed in a first web browser displayed at the host computing device, the injector code generating a second web browser that automatically captures a portion of the webpage displayed within the first web browser, the second web browser displayed at the guest computing device; and
    during the co-browsing session, continuously serving a first web browser viewport comprising an exact reproduction of the portion of the webpage at the second web browser, wherein the exact reproduction includes a pixel-by-pixel rendering of the portion of the webpage comprising at least one of images, text, and multimedia from the portion of the webpage displayed within the first web browser, and at least one of mouse position, mouse movement, and scroll position from the host computing device;

wherein instructions corresponding to the exact reproduction are processed by the second web browser to render the exact reproduction; and, wherein a visible status message is displayed on the first web browser and the second web browser indicating that the co-browsing session is active.

2. The method of claim 1, further comprising receiving guest data identifying the guest computing device, the guest data indicating that the guest computing device intends to participate in the co-browsing session with the host computing device.

3. The method of claim 1, further comprising: identifying the webpage for the co-browsing session; and inserting the injector code into the webpage.

4. The method of claim 1, wherein to generate the second web browser comprises injecting the second web browser into the first web browser, thereby giving the second web browser access to the rendering of the portion of the webpage and functional control of the first web browser.

5. The method of claim 1, wherein the injector code is at least one of an executable code, program code, script, module, applet, and application.

6. The method of claim 1, wherein the portion of the webpage is included in the first web browser viewport included in the first web browser.

7. A system for enabling co-browsing comprising:
a host computing device for displaying a webpage in a first web browser;
a guest computing device for engaging in a co-browsing session with the host computing device; and,
at least one processor coupled to a memory storing instructions for enabling co-browsing, wherein the co-browsing session is enabled by the at least one processor executing the instructions for:
activating injector code embedded within a webpage displayed in the first web browser displayed at the host computing device, the injector code generating a second web browser that automatically captures a portion of the webpage displayed within the first web browser, the second web browser displayed at the guest computing device; and
during the co-browsing session, continuously serving a first web browser viewport comprising an exact reproduction of the portion of the webpage at the second web browser, wherein the exact reproduction includes a pixel-by-pixel rendering of the portion of the webpage comprising at least one of images, text, and multimedia from the portion of the webpage displayed within the first web browser, and at least one of mouse position, mouse movement, and scroll position from the host computing device;
wherein instructions corresponding to the exact reproduction are processed by the second web browser to render the exact reproduction; and,
wherein a visible status message is displayed on the first web browser and the second web browser indicating that the co-browsing session is active.

8. The system of claim 7, wherein the co-browsing session is further enabled by receiving guest data identifying the guest computing device, the guest data indicating that the guest computing device intends to participate in the co-browsing session with the host computing device.

9. The system of claim 7, wherein the co-browsing session is further enabled by:
identifying the webpage for the co-browsing session; and inserting the injector code into the webpage.

10. The system of claim 7, wherein to generate the second web browser comprises injecting the second web browser into the first web browser, thereby giving the second web browser access to the rendering of the portion of the webpage and functional control of the first web browser.

11. The system of claim 7, wherein the injector code is at least one of an executable code, program code, script, module, applet, and application.

12. The system of claim 7, wherein the portion of the webpage is included in the first web browser viewport included in the first web browser.

13. A non-transitory computer-readable medium encoded with instructions for enabling co-browsing, the instructions which when executed by a processor, cause the processor to perform operations, comprising:
initiating a co-browsing session between a guest computing device and a host computing device by:
activating injector code embedded within a webpage displayed in a first web browser displayed at the host computing device, the injector code generating a second web browser that automatically captures a portion of the webpage displayed within the first web browser, the second web browser displayed at the guest computing device; and
during the co-browsing session, continuously serving a first web browser viewport comprising an exact reproduction of the portion of the webpage at the second web browser, wherein the exact reproduction includes a pixel-by-pixel rendering of the portion of the webpage comprising at least one of images, text, and multimedia from the portion of the webpage displayed within the first web browser, and at least one of mouse position, mouse movement, and scroll position from the host computing device;
wherein instructions corresponding to the exact reproduction are processed by the second web browser to render the exact reproduction; and,
wherein a visible status message is displayed on the first web browser and the second web browser indicating that the co-browsing session is active.

14. The non-transitory computer-readable medium of claim 13, the operations further comprising receiving guest data identifying the guest computing device, the guest data indicating that the guest computing device intends to participate in the cobrowsing session with the host computing device.

15. The non-transitory computer-readable medium of claim 13, the operations further comprising:
identifying the webpage for the co-browsing session; and inserting the injector code into the webpage.

16. The non-transitory computer-readable medium of claim 13, wherein to generate the second web browser comprises injecting the second web browser into the first web browser, thereby giving the second web browser access to the rendering of the portion of the webpage and functional control of the first web browser.

17. The non-transitory computer-readable medium of claim 13, wherein the injector code is at least one of an executable code, program code, script, module, applet, and application.

18. The non-transitory computer-readable medium of claim 13, wherein the portion of the webpage is included in the first web browser viewport included in the first web browser.

* * * * *